US008538083B1

(12) United States Patent
Medioni et al.

(10) Patent No.: US 8,538,083 B1
(45) Date of Patent: Sep. 17, 2013

(54) TRACKING MULTIPLE MOVING TARGETS IN DIGITAL VIDEO

(71) Applicant: University of Southern California, Los Angeles, CA (US)

(72) Inventors: Gerard Guy Medioni, Los Angeles, CA (US); Qian Yu, Plainsboro, NJ (US); Isaac Cohen, West Hartford, CT (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 13/784,477

(22) Filed: Mar. 4, 2013

Related U.S. Application Data

(62) Division of application No. 12/470,480, filed on May 21, 2009, now Pat. No. 8,391,548.

(60) Provisional application No. 61/055,092, filed on May 21, 2008.

(51) Int. Cl.
*G06K 9/00* (2006.01)

(52) U.S. Cl.
USPC ........................................................ 382/103

(58) Field of Classification Search
USPC .......................... 382/100–107; 348/169–172
See application file for complete search history.

(56) References Cited

PUBLICATIONS

Bar-Shalom, Y. et al., "Joint probabilistic data association for multiple targets in clutter," Proceedings of the 1980 Conference on Information Sciences and Systems, Papers presented Mar. 26, 27, and 28, 1980, pp. 404-409.

Berclaz, J., F. Fleuret, and P. Fua, "Robust people tracking with global trajectory optimization," 2006 IEEE Computer Society Conference on Computer Vision and Pattern Recognition, vol. 1pp. 744-750, Jun. 17-22, 2006.

Dellaert, F., S. M. Seitz, C. E. Thorpe, and S. Thrun, "Structure from motion without correspondence," IEEE Computer Society Conference on Computer Vision and Pattern Recognition ( CVPR'00 ), 8 pages, Jun. 2000.

Collins, R.T., "Mean-shift blob tracking through scale space," Proceedings. 2003 IEEE Computer Society Conference on Computer Vision and Pattern Recognition, vol. 2, pp. 234-240, Jun. 18-20, 2003.

Cong, S., L. Hong, and D. Wicker, "Markov chain Monte-Carlo approach for association probability evaluation," IEEE Proceedings—Control Theory and Applications, vol. 151, No. 2, pp. 185-193, Mar. 2004.

Cox, I.J. and S.L. Hingorani, "An Efficient Implementation and Evaluation of Reid's Multiple Hypothesis Tracking Algorithm for Visual Tracking," Int. Conf. On Pattern Recognition, pp. 437-442 (1994).

Fortmann, T. E. et al., "Sonar tracking of multiple targets using joint probabilistic data association," IEEE Journal of Oceanic Engineering, vol. OE-8, No. 3, pp. 173-184, (Jul. 1983).

(Continued)

*Primary Examiner* — Atiba O Fitzpatrick
(74) *Attorney, Agent, or Firm* — Fish & Richardson P.C.

(57) ABSTRACT

Tracking multiple targets can include making different observations based on multiple different frames of one or more digital video feeds, determining an initial cover based on the observations, performing one or more modifications to the initial cover to generate a final cover, and using the final cover to track multiple targets in the one or more digital video feeds. Performing one or more modifications to generate a final cover can include selecting one or more adjustments from a group that includes temporal cover adjustments and spatial cover adjustments, and can include using likelihood information indicative of similarities in motion and appearance to distinguish different targets in the frames.

2 Claims, 8 Drawing Sheets

(56) References Cited

PUBLICATIONS

Fortmann, T.E. et al., "Multi-Target Tracking Using Joint Probabilistic Data Association," 19th IEEE Conference on Decision and Control including the Symposium on Adaptive Processes, 1980, pp. 807-812, Dec. 1980.

Genovesio, A. and J.-C. Olivo-Marin, "Split and Merge Data Association Filter for Dense Multi-target Tracking," Proceedings of the 17th International Conference on Pattern Recognition, 2004 (ICPR 2004), vol. 4, pp. 677-680 (Aug. 23-26, 2004).

Green, P.J., "Reversible jump Markov chain Monte Carlo computation and Bayesian model determination," Biometrika 82: 711-732 (1995).

Green, P.J., "Trans-dimensional Markov chain Monte Carlo," Chapter 1 in Highly Structured Stochastic Systems, Oxford University Press, Oxford, 28 pages (2003).

Kang, J., I. Cohen, and G. Medioni, "Continuous tracking within and across camera streams," Proceedings of the 2003 IEEE Computer Society Conference on Computer Vision and Pattern Recognition (CVPR'03), vol. 1, pp. 267-272, Jun. 2003.

Kasturi, P.S.R. et al., "Performance evaluation protocol for face, person and vehicle dectection & tracking in video analysis and content extraction (VACE-II)," Technical Report. Computer Science & Engineering University of South Florida, Tampa, FL, USA, Jan. 30, 2006, 29 pages.

Khan, Z. et al., "An MCMC-Based Particle Filter for Tracking Multiple Interacting Targets," Proceedings ECCV, pp. 279-290, 2003.

Khan, Z., "MCMC-Based Particle Filtering for Tracking a Variable Number of Interacting Targets," IEEE Transactions on Pattern Analysis and Machine Intelligence, vol. 27, No. (11), pp. 1805-1819, (Nov. 2005).

Khan, Z. et al., "Multitarget Tracking with Split and Merged Measurements," Proceedings of the 2005 Computer Society Conference on Computer Vision and Pattern Recognition (CVPR'05), vol. 1, pp. 605-610, 2005.

Mittal, A. and L. Davis, "$M_2$Tracker: A multi-view approach to segmenting and tracking people in a cluttered scene," International Journal of Computer Vision 51(3): 189-203, 2003.

Morefield, C., "Application of 0-1 Integer Programming to Multitarget Tracking Problems," IEEE Transactions on Automatic Control, vol. AC-22, No. 3, pp. 302-312, Jun. 1977.

Oh, S. et al., "Markov Chain Monte Carlo Data Association for General Multiple Target Tracking Problems," Proceedings of the 43rd IEEE Conference on Decision and Control, 2004, 8 pages.

Poore, A.B. "Multidimensional Assignment Formulation of Data Association Problems Arising from Multitarget and Multisensor Tracking," Computational Optimization and Applications, 3, pp. 27-57, 1994.

Reid, D.B., "An Algorithm for Tracking Multiple Targets," IEEE Transactions on Automatic Control, vol. AC-24, No. 6, pp. 843-854 (Dec. 1979).

Smith, K. et al., "Using Particles to Track Varying Numbers of Interacting People," Proceedings of the 2005 IEEE Computer Society Conference on Computer Vision and Pattern Recognition (CVPR'05), pp. 962-969, (Jun. 2005).

Tu, Z. and S. -C. Zhu, "Image segmentation by Data Driven Markov Chain Monte Carlo," IEEE Transactions on Pattern Analysis and Machine Intelligence, 24(5):657-673, (May 2002).

Yilmaz, A., O. Javed, and M. Shah, "Object tracking: A survey," ACM Comput. Surv. 38(4): Article 13, 45 pages (Dec. 2006).

Yu, W. and G. Medioni, "Multiple-Target Tracking by Spatiotemporal Monte Carlo Markov Chain Data Association," IEEE Transactions on Pattern Analysis and Machine Intelligence, IEEE computer Society Digital Library. IEEE Computer Society, vol. 31, 2009, 15 pages (published online Oct. 10, 2008).

Yu, Q. et al., "Multiple Target Tracking Using Spatio-Temporal Monte Carlo Markov Chain Data Association," pp. 1-8, Jun. 17-22, IEEE Conference on Computer Vision and Pattern Recognition, 2007.

Yu, T. and Y. Wu, "Collaborative Tracking of Multiple Targets," Proceedings of the 2004 IEEE Computer Society Conference on Computer Vision and Pattern Recognition (CVPR'04) pp. 834-841, 2004.

Yu, Q. and G. Medioni, "Integrated Detection and Tracking for Multiple Moving Objects using Data-Driven MCMC Data Association," IEEE Workshop on Motion and Video Computing (WMVC), Jan. 8-9, 2008, Copper Mountain, Colorado, 8 pages.

Zhao, T. and R. Nevatia, "Tracking multiple humans in crowded environment," Proc. IEEE Conf. Computer Vision and Pattern Recognition, vol. 2, pp. 406-413, 2004.

Spatio-temporal MCMC Data Association Algorithm

Input: $Y, n_{mc}, \omega^* = \omega_0$ Output: $\omega^*$
for $n = 1$ to $n_{mc}$ do
   if $n < \epsilon * n_{mc}$ then
      Sample one temporal move.
   else
      Sample one move from all candidate moves.
   Propose $\omega'$ according to $q(\omega'|\omega)$
   Sample $U$ from $\text{Unif}[0,1]$
   if $U < A(\omega, \omega')$ then $\omega_n = \omega'$,
   else $\omega_n = \omega$
   if $p(\omega_n|Y) > p(\omega^*|Y)$ then
      $\omega^* = \omega_n$
end for

FIG. 5

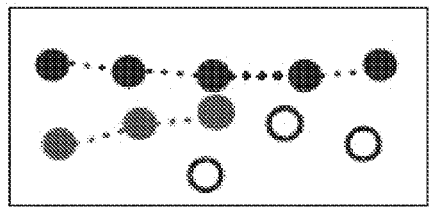 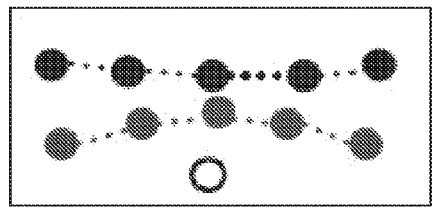
Extension/ Reduction
FIG. 6A
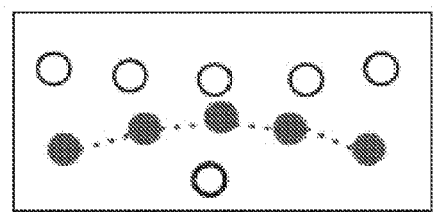 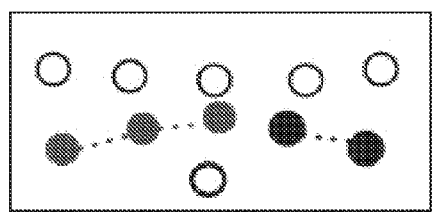
Split/Merge
FIG. 6B
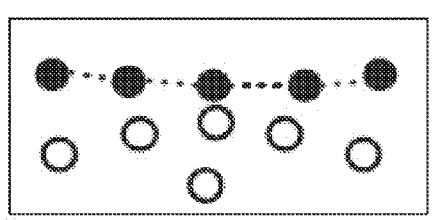 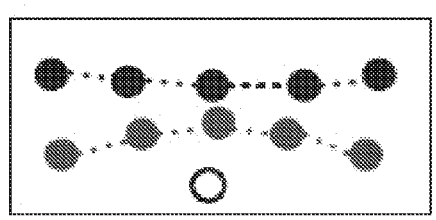
Birth/ Death
FIG. 6C
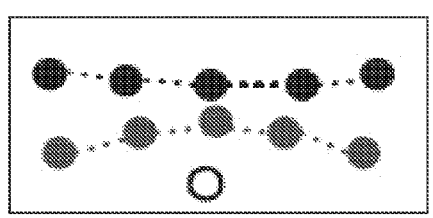 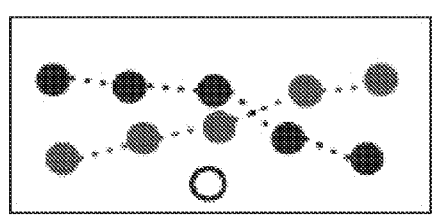
Switch
FIG. 6D
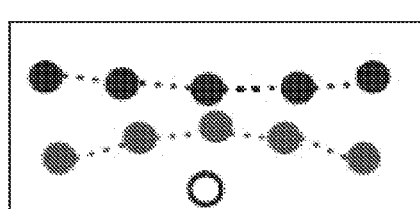 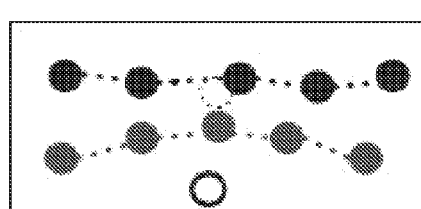
Diffusion
FIG. 6E

TRACKING MULTIPLE MOVING TARGETS IN DIGITAL VIDEO

PRIORITY CLAIM

This document is a divisional of U.S. patent application Ser. No. 12/470,480 entitled "TRACKING MULTIPLE MOVING TARGETS IN DIGITAL VIDEO" and filed on May 21, 2009 (now U.S. Pat. No. 8,391,548), which claims the benefit of U.S. Provisional Application No. 61/055,092 entitled "TRACKING MULTIPLE MOVING TARGETS IN DIGITAL VIDEO" and filed on May 21, 2008, each of which are incorporated by reference as part of the disclosure of this document.

FEDERALLY SPONSORED RESEARCH OR DEVELOPMENT

The invention in this document was made with government support under Grant No. 14298.7584 awarded by the Office of Naval Research (ONR). The government has certain rights in the invention.

BACKGROUND

This document relates to target tracking.

Digital video surveillance systems can produce images that depict one or more moving targets. These systems can track a target of interest by analyzing the images. For example, a digital video surveillance system can determine a trajectory of a target such as a moving vehicle or human. Various imaging devices such as digital video recorders and digital cameras, e.g., stationary cameras and unmanned aerial vehicles cameras, can produce a video feed. A video feed can include a sequence of frames depicting moving targets.

In some implementations, digital video surveillance systems can include one or more digital video cameras and one or more computer processors to analyze the data feed coming from the one or more digital video cameras. A communication network such as the Internet can deliver video feed of a digital video camera to the one or more computer processors.

SUMMARY

This document describes technologies, among other things, for tracking multiple moving targets.

In one aspect, methods for tracking multiple moving targets can include making different observations based on multiple different frames of one or more digital video feeds, determining an initial cover based on the observations, performing one or more modifications to the initial cover to generate a final cover, and using the final cover to track multiple targets in the one or more digital video feeds. Performing one or more modifications to generate a final cover can include selecting one or more adjustments from a group that includes temporal cover adjustments and spatial cover adjustments, and can include using likelihood information indicative of similarities in motion and appearance to distinguish different targets in the frames. Each observation can correspond to a region of a frame. The initial cover can include one or more tracks and each track can include at least one of the observations. The one or more modifications can be selected from a group of temporal and spatial cover adjustments. Other implementations can include corresponding systems, apparatus, and computer programs, configured to perform the actions of the methods, encoded on computer readable mediums.

These and other implementations can include one or more of the following features. In some implementations, performing the one or more modifications can include accessing a first cover of the observations, selecting an adjustment from the group, generating a second cover based on an application of the selected adjustment to the first cover, and selectively outputting the second cover based on an acceptance function and a comparison between a posteriori probability values corresponding to the first and second covers. Generating the second cover can include selecting a first observation associated with a first track in the first cover; selecting one or more observation candidates from the observations; computing a joint motion and appearance likelihood for each observation candidate; and assigning one of the observation candidates to the first track based on the one or more computed joint motion and appearance likelihoods. Each computed joint motion and appearance likelihood can represent a likelihood of assigning an observation candidate to the first track with respect to the first observation. Selecting one or more observation candidates from the observations can include selecting one or more of the observations based on a temporal distance and spatial distance from the first observation and a threshold. Performing the one or more modifications can include using forward and backward temporal inferences to modify the initial cover; and assessing the second cover by a joint motion and appearance consistency measure.

In some implementations, performing the one or more modifications can include modifying a cover to refine spatial and temporal associations between different observations in a maximum a posteriori (MAP) determination. Performing the one or more modifications can include using a Data Driven Markov Chain Monte Carlo (DD-MCMC) algorithm to generate one or more different covers of the observations. Performing one or more modifications can include modifying the initial cover to generate a final cover indicating spatial and temporal associations between at least a portion of the observations in a maximum a posteriori (MAP) determination. Some implementations can use linear programming to determine parameter values associated with the MAP determination.

In some implementations, performing the one or more modifications can include performing Markov Chain Monte Carlo sampling to generate the final cover to refine spatial and temporal associations between at least a portion of the observations in a maximum a posteriori (MAP) determination. The sampling can be based on the group of temporal cover adjustments and spatial cover adjustments.

In another aspect, methods for target tracking can include accessing multiple observations, the multiple observations collectively including depictions of two or more mobile targets; processing the observations to produce an initial cover, the initial cover including tracks that correspond to movements of the two or more mobile targets through space and time; and iteratively refining the initial cover to produce a refined cover by using a Data Driven Markov Chain Monte Carlo (DD-MCMC) routine. Other implementations can include corresponding systems, apparatus, and computer programs, configured to perform the actions of the methods, encoded on computer readable mediums.

In another aspect, a system for target tracking can include a digital video camera that produces a digital video feed and a processor in communication with the digital video camera to receive the digital video feed. The processor can be configured to perform operations that include accessing multiple frames of the digital video feed, the multiple frames collectively including depictions of two or more mobile targets; processing the frames to produce an initial cover, the initial cover including tracks that correspond to movements of the two or more mobile targets through space and time; and iteratively refining the initial cover to produce a refined cover by using a Data Driven Markov Chain Monte Carlo (DD-MCMC) routine.

In another aspect, an image processing system can include a memory configured to store multiple images of an object; and processor electronics in communication with the memory. The processor electronics can be configured to perform one or more of the techniques described herein.

In another aspect, an image processing system can include a memory configured to store multiple different frames of one or more digital video feeds; and processor electronics in communication with the memory. The processor electronics can be configured to perform one or more of the techniques described herein.

Particular embodiments of the subject matter described in this document can be implemented so as to realize one or more of the following advantages. The described technologies can overcome difficulties encountered with using one-to-one mappings between observations and targets. For example, the described technologies can recover trajectories of targets over time from noisy and/or occluded observations of one or more targets. Activity recognition modules can benefit from knowing the spatio-temporal relationships among moving objects in the scene. A data driven MCMC algorithm can sample the solution space efficiently and the forward and backward inferences enhance the search performance. Compared to other data association algorithms, the described technologies can generate better temporal and spatial associations. For example, the described technologies can generate a better consistency of labels and more accurate outlined regions.

The details of one or more implementations are set forth in the accompanying attachments, the drawings, and the description below. Other features will be apparent from the description and drawings, and from the claims.

BRIEF DESCRIPTION OF THE DRAWINGS

FIG. 5 shows an example of a spatio-temporal MCMC data association algorithm.

FIG. 6A, 6B, 6C, 6D, 6E show different examples of temporal and spatial moves.

Like reference symbols in the various drawings indicate like elements.

DETAILED DESCRIPTION

Figure 1A:
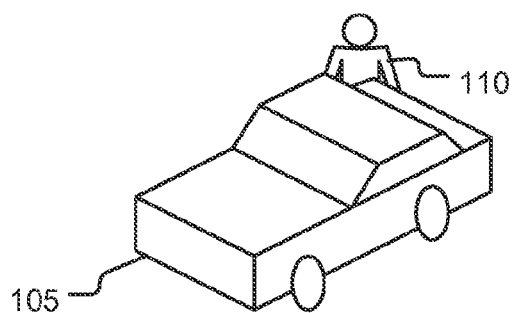
FIG. 1A shows an example of a foreground region in one frame.

Object tracking is a fundamental issue for video analysis and surveillance systems. In terms of the number of objects of interest, tracking can be categorized into two types. One is single object tracking, which focuses on estimating the state, e.g., position, dimension, and velocity, of the object according to an appearance or motion cues. A different type is multiple target tracking. For multiple target tracking, since there can exist multiple targets and multiple observations of targets in each frame, data association can become very important in multiple target tracking. A tracking algorithm that tracks multiple targets data association and state estimation are inter-related. Once data association is established, filtering techniques can be applied to estimate the state of targets. One way to evaluate a possible data association is to determine whether the estimated states of targets form consistent trajectories in terms of both motion and appearance.

A tracking algorithm that tracks multiple targets in a video feed can provide the description of spatio-temporal relationships among moving targets in the scene. Unlike single target tracking, where the main focus is modeling the appearance of the target or estimating the kinematics state, a multiple targets tracking algorithm can recover the data association between multiple targets and multiple observations.

Due to occlusions by targets, static objects, noisy segmentation, and false alarms, one foreground region of a frame may not faithfully correspond to one target. Some data association algorithms may use a one-to-one mapping between targets and observations, under the assumption that, at a given time instant, one observation can be associated with at most one target and vice versa: one target corresponds to at most one observation. This assumption is reasonable in various practical applications when the considered observations are punctual. However, in the visual tracking problem, the observations corresponding to blobs or meaningful regions which may not be faithfully modeled by a single point. Moreover, erroneous detections due to occlusion and spurious motion segmentation may provide a set of observations where a single moving object is detected as multiple moving regions, or multiple moving regions are merged into a single blob. Therefore, the one-to-one association is often violated in real environments.

This document describes, among other things, a framework that overcomes the assumption of an one-to-one mapping between observations and targets by formulating the visual tracking problem in terms of finding the best spatial and temporal association of observations that maximize the consistency of both motion and appearance of trajectories. Instead of inferring the association and targets' states according to current observations, the framework can use a batch of observations. The framework can recover the tracks, e.g., paths in space-time, of an unknown number of targets using the consistency in motion and appearance of tracks. Due to the high computational complexity of such an association scheme, the framework can use a spatio-temporal Data-Driven Markov Chain Monte Carlo (DD-MCMC) to sample a solution space. Both spatial and temporal association samples are incorporated into the Markov chain transitions. The sampling can be driven by an informed proposal scheme controlled by a joint probability model combining motion and appearance.

The framework can encode both motion and appearance information in a posterior distribution, which can allow the framework to deal with region-based observations in vision applications. Since the success of a maximum a posteriori (MAP) formulation relies on the definition of a posterior distribution, the framework can avoid determining the posterior empirically, and instead can estimate the parameters in the posterior offline.

In some implementations, the framework for multiple target tracking can include a background learning module and a target tracking module. The background learning module can produce a set of candidate regions in each frame of a video feed to serve as inputs for the target tracking module. The framework can accommodate additional information, such as generic model information. In some implementations, the framework can use an automatic approach to determine the parameters in the target distribution which can assist a Markov chain to converge to a desired distribution.

The input for a tracking algorithm can include a set of regions formed by foreground segmentation. There are K unknown targets in the scene within the time interval $[1,T]$. Let $y_t$ denote the set of foreground regions at time t, and $Y=\cup_{t-1}^{T} y_t$ be the set of all available foreground regions within $[1,T]$. In the simplest case, a single target is perfectly segmented from the background, and tracking is straightforward. When there are multiple targets in the scene, and they never overlap, nor get fragmented, the one-to-one mapping, which is assumed by many tracking algorithms, holds: any track $\tau_k$ contains at most one observation at one time instant, e.g., $|\tau_k \cap y_t| \leq 1$, $\forall k \in [1,K]$, and no observation belongs to more than one track: $\tau_i \cap \tau_j = \emptyset$ $i \neq j$, $\forall i,j \in [1,K]$. If the one-to-one mapping holds, tracking can be done by associating the foreground regions directly.

In some cases, a foreground region may correspond to multiple targets and one target may correspond to multiple foreground regions. Without using any model information, it may be difficult to segment the foreground regions in a single frame. However, if we consider this task in space-time, the smoothness in motion and appearance of targets can be used to solve this problem. One example is shown in FIGS. 1A and 1B.

Figure 1B:
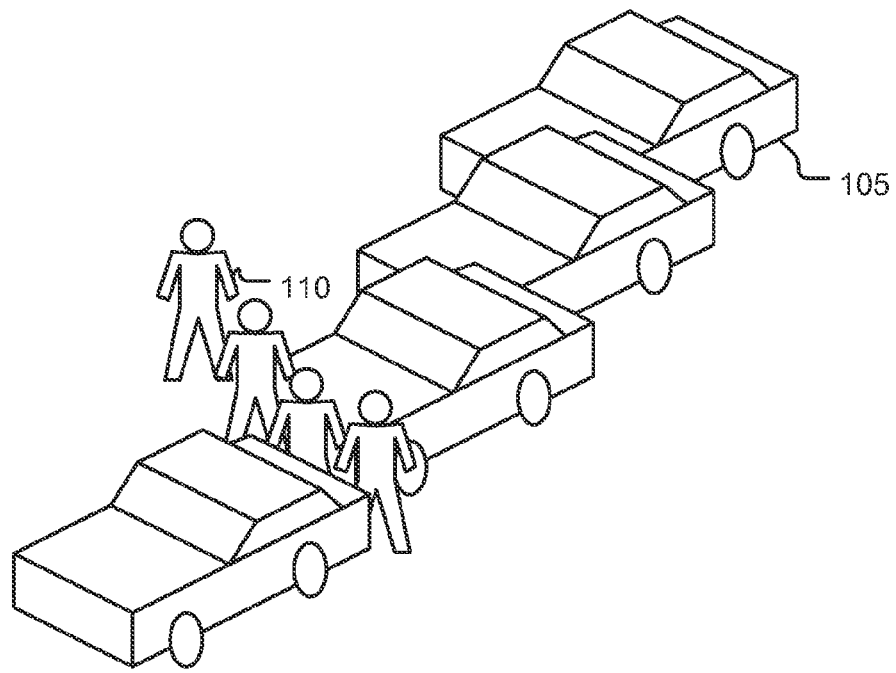
FIG. 1B shows an example of a segmentation of foreground regions in space-time by the use of motion and appearance smoothness over multiple frames.

FIG. 1A shows an example of a foreground region in one frame. The region includes a depiction of a car 105 and a partially occluded human target 110. FIG. 1B shows an example of a segmentation of foreground regions in space-time by the use of motion and appearance smoothness over multiple frames. FIG. 1B shows a sequence of observations corresponding to a car target 105 and a sequence of observations corresponding to a human target 110. If we look at several observations over time, smoothness in motion and appearance of targets helps to disambiguate the targets.

Figure 1C:
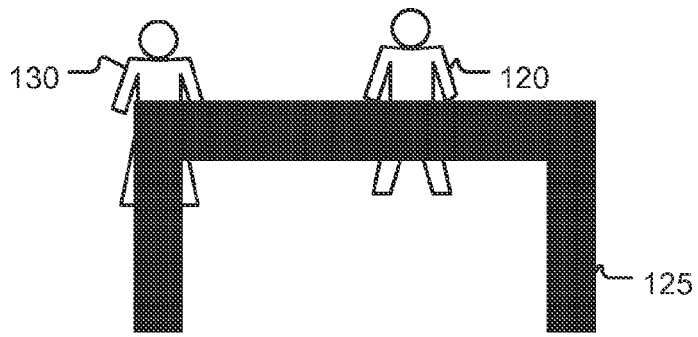
FIG. 1C shows an example of one object being partially occluded by a different object.

FIG. 1C shows an example of one object being partially occluded by a different object. In this example, a frame depicts humans 120, 130 partially occluded by a structure 125. The human 120 is split into an upper half and a lower half by the structure 125. An occlusion can generate different observations for a target, e.g., observations corresponding to upper and lower halves of human 120. The technologies described in this application can associate different observations with a target.

There are several ways to represent foreground regions corresponding to different targets. The most detailed representation is to assign to each foreground pixel a label (or a set of labels). The label (or labels) indicates the target (or targets) that the pixel belongs to. We can use the case where one pixel is assigned to multiple labels to represent the occlusion situation. Note that areas with a common label may not necessarily be connected. This is different from a partition segmentation problem, where regions must be disjoint, e.g., each pixel belongs to one region exclusively. Although such a representation is very accurate, labeling each pixel is expensive to implement. A different representation can use rectangles to approximately represent the shapes of targets and the bounding rectangles form a cover of foreground regions. The overlap between two rectangles indicates an occluded area. Given pixel labels, we can precisely derive a rectangle cover representation, and conversely pixel labels can be approximated obtained from the rectangle cover representation. The approximation is useful since it provides an efficient explanation of foreground regions with occlusion, and significantly reduces the complexity of the problem.

Figure 2A:
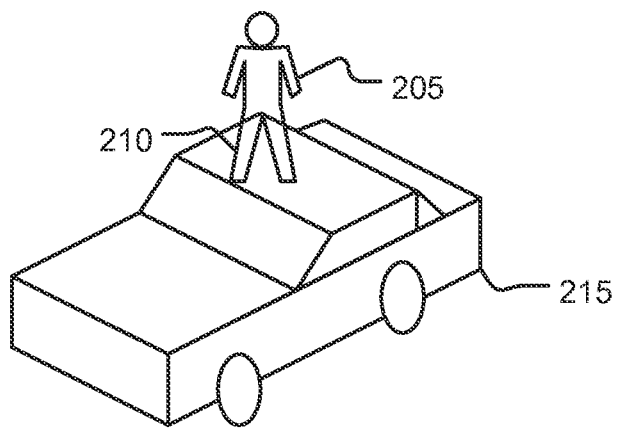
FIG. 2A, 2B show different examples of foreground region representations.
Figure 2B:
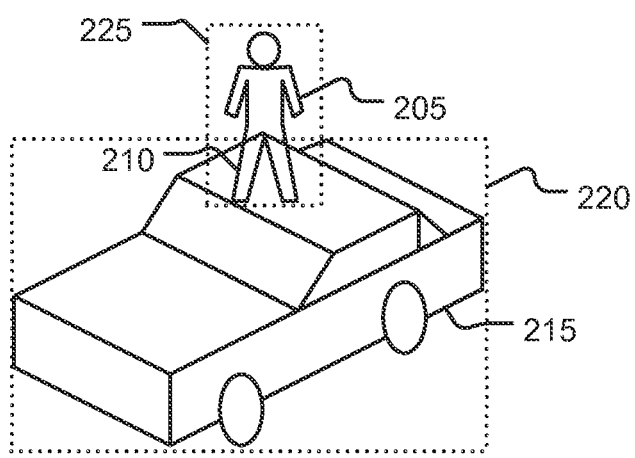

FIG. 2A, 2B show different examples of foreground region representations. In FIG. 2A, area 215 has one label and includes the portion of a car not occluded a human: area 210 has two labels and includes the portion of the car occluding the human; and area 205 has one label and includes the portion of the human not occluded by the car. In some implementations, labels are applied to individual pixels. FIG. 2B shows different rectangle covers 220, 225 for the car and the human respectively.

In a rectangle cover representation scheme, the center and the size of a rectangle are used as the abstract representation of motion states, and the foreground area covered by a rectangle contains the appearance of one target. Covering rectangles with labels (track IDs) over time form a cover of foreground regions in a sequence of frames, and a track is a set of covering rectangles with the same label. Formally, a cover $\omega$ with m covering rectangles of Y is defined as follows:

$$\omega = \{CR_i = (r_i, t_i, l_i)\}, r_i \in \Pi_r, t_i \in [1,T], l_i \in [1,K] \quad (1)$$

subject to $$\forall i,j, i \neq j \in [1,m], t_i \neq t_j, l_i \neq l_j \quad (2)$$

where $CR_i$ is one covering rectangle and $r_i$ and $t_i$ represent the state (center position and size) and the time stamp for one rectangle, $l_i$ indicates the label assigned to the rectangle $r_i$, K is the upper bound of the number of targets. $\Pi_r$ is the set of all possible rectangles. Although the candidate space of possible rectangles is very large, e.g., $|\Pi_r|$ is a large number, it is still a finite number if we discretize the state of a rectangle in 2D image space.

The constraint in Eq.2 means that any two covering rectangles cannot share the same time stamp and track label. In other words, one track can have at most one covering rectangle at one time instant. Thus, the number of rectangles that one cover can contain is bounded, $m \leq M = KT$. The way to form one cover can be regarded as: first select m rectangles from space $\Pi$, and then fill them into KT sites. One site corresponds to one unique pair of time mark and track label, e.g., $<t_i, l_i>$. No two rectangles can fill the same site. Let $\tau_k(t)$ denote the covering rectangle in track k at time t. If we consider $\tau_k(t)$ a virtual measurement, the data association between virtual measurements still complies to the one-to-one mapping, namely, there is at most one virtual measurement for one track at one time instant. The virtual measurement derives from foreground regions: a virtual measurement can correspond to (e.g., cover) more than one foreground region or a part of a foreground region. The relationship between virtual measurements and real observations from foreground regions reveals the spatial data association between foreground regions. By introducing the concept of virtual measurement, we differentiate a spatial data association from a temporal data association. The optimal joint spatio-temporal data association leads to the final solution for such a multiple target tracking problem.

Let $\Pi_M^m$, denote the space of all possible combinations of m locations from M sites, the whole solution space ($\omega \in \Omega$) can be represented as $$\Omega = \bigcup_{m=1}^{M} \Omega_m = \bigcup_{m=1}^{M} \left[ \pi_M^m \times \underbrace{\pi_r \times \ldots \times \pi_r}_{m} \right] \quad (3)$$

The structure of the solution space is typical for vision problems. The solution of the segmentation problem can be formulated such that the entire solution space is a union of m−partition spaces (m is the number of regions).

In the case of a single target with perfect foreground segmentation, the set of Minimum Bounding Rectangles (MBRs) for each foreground region at different times forms the best cover of the target. However, when inter-occlusion between multiple targets and noisy foreground segmentation exists, it is not trivial to find the optimal cover.

Let $\tau_k$ denote one track in a cover $\omega$. A cover with K tracks can also be written as follows.

$$\omega = \{\tau_i, \ldots, \tau_K\} \quad (4)$$

In some implementations, a cover can include a set of tracks. Each track can include a sequence of covering rectangles. As defined in Eq. 1, besides the location and the size, each covering rectangle has two properties, the track ID and the time label. Temporal data association is implemented by changing the track IDs. For example, a track can be split into two or more tracks. Spatial data association involves the operation of changing the location and the size of one covering rectangle, for example, a diffusion of one track at a time. Intuitively, exploring the solution space from one cover to another cover is implemented by changing properties of the covering rectangles.

Figure 3:
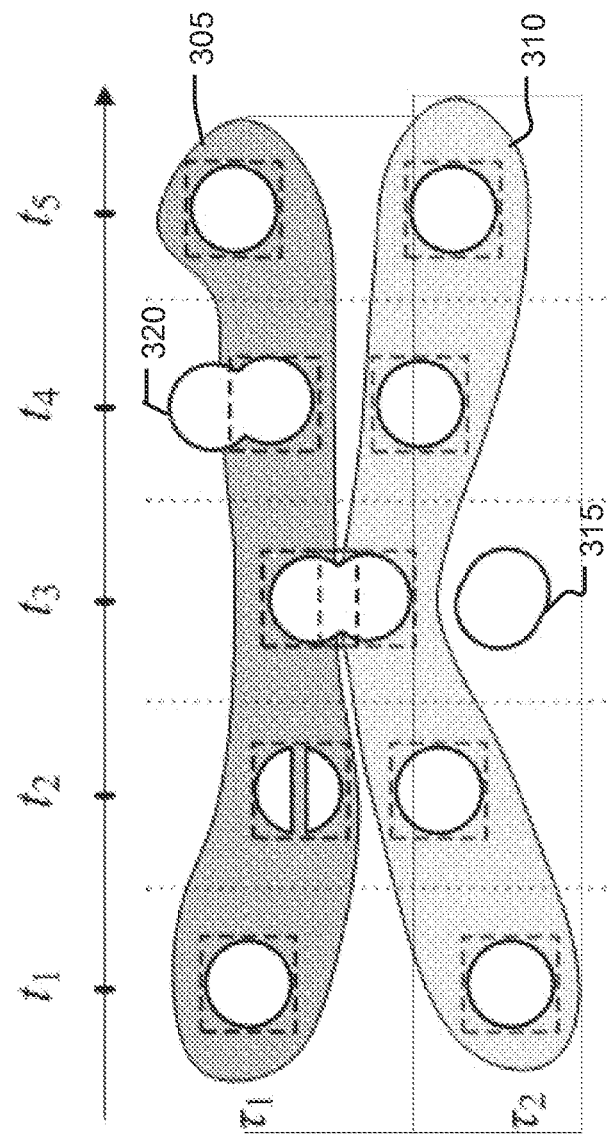
FIG. 3 shows an example of a cover for different observations.

FIG. 3 shows an example of a cover for different observations. FIG. 3 shows a case with observations in 5 frames (frames corresponding to times: $t_1$, $t_2$, $t_3$, $t_4$, and $t_5$). This example shows one possible cover of the observations, which includes two tracks 305, 310 labelled respectively as $\tau_1$ and $\tau_2$. Here, the possible cover is expressed has $\omega = (\tau_1, \tau_2)$. In the example, track $\tau_1$ 305 and track $\tau_2$ 310 each contain five rectangles, one at each time instant. FIG. 3 also shows examples of the cases of split observations (e.g., frame 2 corresponding to $t_2$) and merged observations (e.g., frame 3 corresponding to $t_3$). This example shows one possible cover of the observations. The uncovered regions 315, 320 correspond to false alarms.

The underlying constraint for tracking is that a good explanation of the foreground regions exhibits good consistency in motion and appearance over time. Formally, in an Bayesian formulation, the tracking problem is to find a cover to maximize a posterior (MAP) of a cover of foreground regions, given the set of observations Y:

$$\omega^* = \arg\max(p(\omega|Y)) \quad (5)$$

In the MAP problem defined in Eq.5, the cover $\omega$ is denoted by a set of hidden variables. We make inference about $\omega$ from Y over a solution space $\omega \in \Omega$.

$$\omega \sim p(\omega|Y) \propto p(Y|\omega)p(\omega), \omega \in \Omega \quad (6)$$

The likelihood $p(Y|\omega)$ represents how well the cover $\omega$ explains the foreground regions Y in terms of the spatial-temporal smoothness in both motion and appearance. The prior model regulates the cover to avoid overfitting the smoothness. A tracking algorithm can use prior and likelihood models.

To find a cover with reasonable properties, a tracking algorithm can use a prior probability model that prefers a small number of long tracks with little overlap with other tracks.

Accordingly, a tracking algorithm can use a prior probability of a cover $\omega$ that is the product of several terms:

$$p(\omega) = p(N)p(L)p(O) \quad (7)$$

(1) Number of tracks. Let K denote the number of tracks. In some implementations, a tracking algorithm can exponential model p(N) to penalize the number of tracks.

$$p(N) = \frac{1}{z_0} \exp(-\lambda_0 K) \quad (8)$$

(2) Length of each track. In some implementations, a tracking algorithm can use an exponential model p(L) of the length of each track. Let $|\tau_k|$ denote the length, e.g., the number of elements in $\tau_k$.

$$p(L) = \prod_{k=1}^{K} \frac{1}{z_1} \exp(\lambda_1 |\tau_k|) \quad (9)$$

(3) Spatial overlap between different tracks. In some implementations, a tracking algorithm can use an exponential model in Eq. 10 to penalize overlap between different tracks, where $\Gamma(t)$ denotes the average overlap ratio of different tracks at time t.

$$p(O) = \prod_{t=1}^{T} \frac{1}{z_3} \exp(-\lambda_2 \Gamma(t)) \quad (10)$$

$$\Gamma(t) = \frac{\sum_{\tau_i(t) \cap \tau_j(t) \neq \emptyset} \left| \frac{\tau_i(t) \cap \tau_j(t)}{\tau_i(t) \cup \tau_j(t)} \right|}{|\tau_i(t) \cap \tau_j(t) \neq \emptyset|}$$

In the solution space of Eq.3, the prior model is applied to prevent the adoption of a more complex model than necessary. For example, a short track may have better smoothness than a long track. Merely considering the smoothness defined by the likelihood may segment a long track into short tracks. In an extreme condition, each track contains a single observation, and has the best smoothness. The prior penalizes such an extreme condition by all three terms, the number of tracks, length of each track and overlap among different tracks. We consider another extreme condition: a cover $\omega_1$ that contains two perfect tracks, $\tau_1$ and $\tau_2$, that 100% overlap with each other; another cover $\omega_2$ with one track $\tau_1$. Without the prior, the decision cannot be made since the number of targets is unknown and $\omega_1$ and $\omega_2$ have the same smoothness. The parameters in the prior model are hard to determine empirically.

It can be assumed the characteristics of motion and appearance of targets are independent, therefore the joint likelihood $p(Y|\omega)$ can be written as $$p(Y|\omega) = f_F(\omega) \prod_{k=1}^{K} f(\tau_k) \quad (11)$$

where $f_F(\omega)$ represents the likelihood of the uncovered foreground area by $\omega$ and $f(\tau_k)$ is the likelihood for each track. The area not covered by any rectangle indicates the false alarm in observations. Foreground regions can be covered as much as possible unless the spatio-temporal smoothness prevents us from doing so. In some implementations, a tracking algorithm can use an exponential model of uncovered areas as $$f_F(\omega) = \frac{1}{z_3} \exp(-\lambda_3 F) \tag{12}$$

where F is the foreground area (in pixels) which is not covered by any track. The appearance of foreground regions covered by each track $\tau_k$ is supposed to be coherent, and the motion of such a rectangle sequence should be smooth. Hence, we consider a probabilistic framework for incorporating two parts of independent likelihoods: motion likelihood $f_M$, appearance likelihood $f_A$, then $$f(\tau_k) = f_M(\tau_k) f_A(\tau_k) \tag{13}$$

We can represent the elements (rectangles) in track $\tau_k$ as $(\tau_k(t_1), \tau_k(t_2), \ldots, \tau_k(t_{|\tau_k|}))$, where $t_i \in [1,T]$, and $(t_{i+1}-t_i) \geq 1$. Each $\tau_k(t_i)$ can be regarded as the observation of track k at time $t_i$. Since missing detection may happen, it is possible that no observation is assigned to track $\tau_k$ in the time domain $(t_i, t_{i+1})$.

A tracking algorithm can use a linear kinematic model. For each target, a linear kinematic model can be expressed as $$x_{t+1}^k = A x_t^k + w \tag{14}$$
$$y_t^k = H x_t^k + v$$

where $x_t^k$ is the hidden kinematic state vector, which includes the position (u,v), size (w,h) and the first order derivatives ($\dot{u}$, $\dot{v}$, $\dot{w}$, $\dot{h}$) in 2D image coordinates. The observation $y_t^k$ in Eq. 14 corresponds to the position and size of $\tau_k(t)$ in 2D image coordinates. $w \sim N(0,Q)$, $v \sim N(0,R)$ are Gaussian process noise and observation noise. To determine the motion likelihood $L_M$ for each track, according to Eq. 14, it is known that an observation $\tau_k(t_i)$ has a Gaussian probability density function $N(\bullet;\mu,\Sigma)$ given the predicted kinematic state $\bar{\tau}_k(t_i)$, $$L_M[\tau_k(t_i)|\bar{\tau}_k(t_i)] \triangleq L_M[\tau_k(t_i)] = N(\tau_k(t_i); H\bar{\tau}_k(t_i), S_k(t_i)) \tag{15}$$

where $S_k(t_i) = H\bar{S}_k(t_i)H^T + R$ and $\bar{S}_k(t_i)$ is the prior estimate of the covariance matrix at time $t_i$. The motion likelihood for track k can be represented as $$f_M(\tau_k) = \prod_{i=3}^{|\tau_k|} L_M[\tau_k(t_i)] \tag{16}$$

Since we consider derivatives in kinematic states, we need two observations to initialize one track. Thus, motion likelihood can be computed from the third observation on. The motion likelihood in Eq.15 can be obtained as follows.

$$N[\tau_k(t_i)] = \tag{17}$$
$$|2\pi S_k(t_i)|^{\frac{1}{2}} \exp^{\frac{1}{2}\{(e_k(t_i))^T \{S_k(t_i)\}^{-1} e_k(t_i)\}} e_k(t_i) = \tau_k(t_i) - H\tau_k(t_i|t_i-1)$$

Note that if missing detection happens in $\tau_k$ at time t, or say there is no observation at time t for track k, the prior estimate is assigned to the posterior estimate.

In order to model the appearance of each detected region, a tracking algorithm can use a non-parametric histogram-based descriptor to represent the appearance of foreground area covered by $\omega$. The appearance likelihood of one track is modeled as a chain-like MRF (Markov Random Field). The likelihood between two neighbors is defined as follows.

$$L_A(\tau_k(t_i), \tau_k(t_{i-1})) \triangleq L_A[\tau_k(t_i)] = (1/z_4) \exp(-\lambda_4 D(\tau_k(t_i), \tau_k(t_{i-1}))) \tag{18}$$

where $D(\bullet)$ represents the symmetric Kullback-Leibler Distance (KL) between the histogram-based descriptors of foreground covered by $\tau_k(t_i)$ and $\tau_k(t_{i+1})$. The entire appearance likelihood of $\tau_k$ can be factorized as $$f_A(\tau_k) = \prod_{i=2}^{|\tau_k|} L_A[\tau_k(t_i)] \tag{19}$$

Given one cover, the motion and appearance likelihood of a target is assumed to be independent of other targets. The joint likelihood of a cover can be factorized in Eq. 20.

$$p(Y|\omega) = \tag{20}$$
$$f_F(\omega) \prod_{k=1}^{K} f_M(\tau_k) f_A(\tau_k) = f_F(\omega) \prod_{k=1}^{K} \left( \prod_{i=3}^{|\tau_k|} L_M[\tau_k(t_i)] \prod_{i=2}^{|\tau_k|} L_A[\tau_k(t_i)] \right)$$

With some manipulations, $p(\omega|Y)$ can be expressed as:

$$p(\omega|Y) \propto \exp\{-C_0 S_{len} - C_1 K - C_2 F - C_3 S_{olp} - C_4 S_{app} - S_{mot}\} \tag{21}$$

$$S_{len} = -\left( \sum_{k=1}^{K} |\tau_k| \right)$$

$$S_{olp} = \left( \sum_{T=1}^{T} \Gamma(t) \right)$$

$$S_{app} = \sum_{k=1}^{K} \sum_{i=2}^{|\tau_k|} D(\tau_k(t_i), \tau_k(t_{i+1}))$$

$$S_{mot} = \sum_{k=1}^{K} \sum_{i=3}^{|\tau_k|} (\log(|S_k(t_i)|) + e(t_i)^T S_k(t_i)^{-1} e(t_i))$$

where $e(t_i) = \tau_k(t_i) - \bar{\tau}_k(t_i|t_i-1)$ and $C_0, \ldots, C_4$ are positive real constants, which are newly introduced parameters replacing $(\lambda_i, z_i)$, $i=0, \ldots, 4$. The parameters in the prior and likelihood functions are absorbed in the free parameters $C_0, \ldots, C_4$. Once one possible cover $\omega$ is given, the variable $S_{len}$, K, F, $S_{oip}$, $S_{app}$ and $S_{mot}$ can be computed. The global maximum, e.g., mode in statistics, of the posterior $p(\omega|Y)$ is a MAP solution. Eq. 21 shows that a MAP estimation can be equivalent to finding the minimum of an energy function.

A tracking algorithm can use a spatio-temporal data-driven MCMC data association algorithm to estimate the best spatio-temporal cover of foreground regions. To ensure that detailed balance is satisfied, a Markov chain can be ergodic and aperiodic. Due to ergodicity of the Markov chain, there is always a "path" from one state to another state with non-zero probability. Flexibility in the transition of Markov chain can reduce the mixing time. Such flexibility can include a group of temporal and spatial adjustments, e.g., moves. The grouping of temporal moves can contain some redundancy, for example, merge (or split) can be implemented by death moves with extension moves and switch can be implemented by split and merge moves. Second, within a time span, the "future" and "past" information is symmetric: we can extend a track in both the positive and negative time direction. Thus, some tracking algorithms can select moves uniformly at random (u.a.r.) in both temporal directions: forward and backward. This bidirectional sampling has more flexibility and reduces the total number of samples. sampling in the positive time direction can be symmetric with the sampling in a different direction.

To make the sampling more efficient, we can define the neighborhood in spatio-temporal space. Two covering rectangles are regarded as neighbors if their temporal distance and spatial distance is smaller than a threshold. The neighborhood actually forms a graph, where a covering rectangle corresponds to a node and an edge between two nodes indicates two covering rectangles are neighbors. The terms "node" and "covering rectangle" can be used interchangeably. A neighbor with a smaller (larger) frame number is called a parent (child) node. The neighborhood makes the algorithm more manageable since candidates are considered only within the neighborhood system. The joint motion and appearance likelihood of assigning an observation y (e.g., one foreground region) to a track $\tau_k$ after $t_i$ is represented as $$L(y|\tau_k(t_i))=L_M(y|\tau_k(t_i))L_A(y,\tau_k(t_i)) \quad (22)$$

In a proposal distribution implementation, the sampler can contain two types of moves: temporal and spatial moves. One move here means one transition of the state of the Markov chain. Temporal moves only change the label of rectangles in the cover. However, since detected moving regions do not always correspond to a single target (they may represent parts of a target or delineate multiple targets moving closely to each other), merely using temporal moves cannot probe the spatial cover of the foreground. Hence, we propose a set of spatial moves to segment, aggregate or diffuse detected regions to infer the best cover of the foreground. The spatial and temporal moves are interdependent: the result of a spatial move is evaluated within temporal moves, and the result of a temporal move guides subsequent spatial moves.

Figure 4:
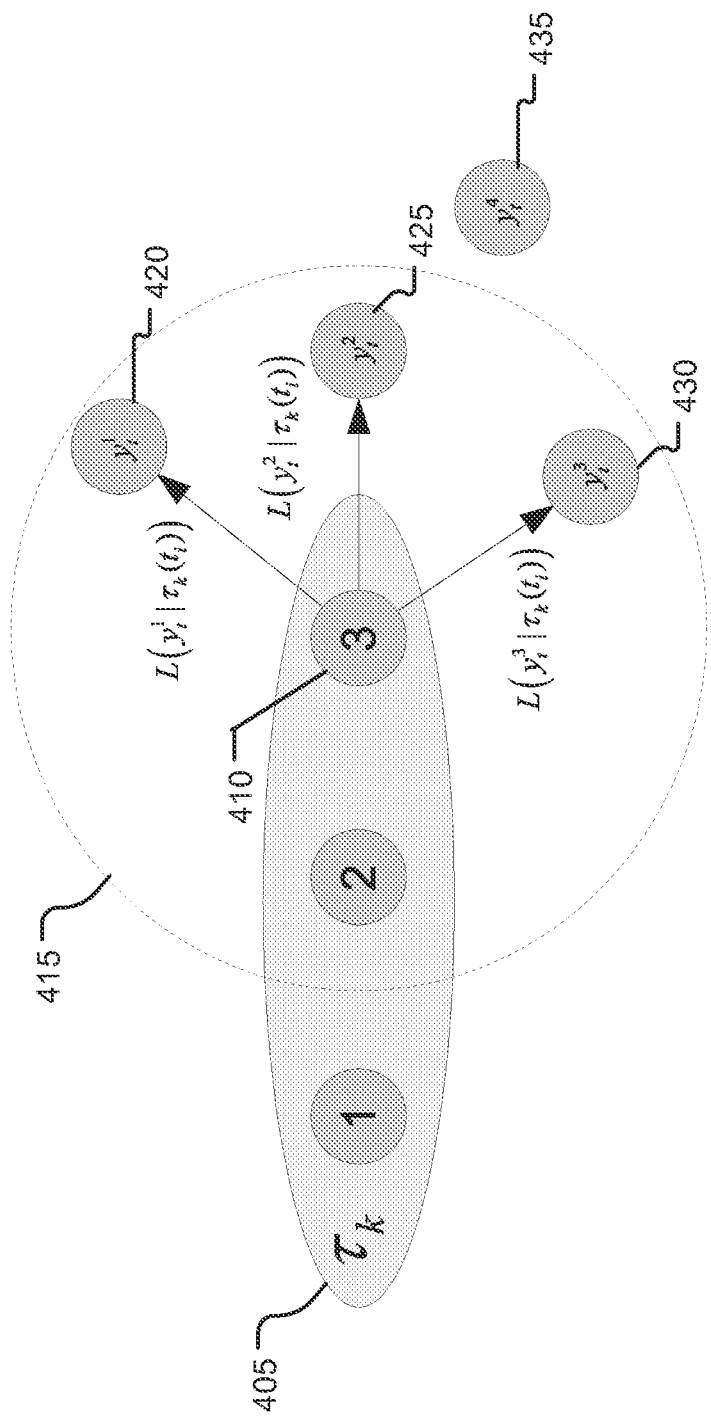
FIG. 4 shows an example of a neighborhood and association likelihoods.

FIG. 4 shows an example of a neighborhood and association likelihoods. This example shows a track $\tau_k$ 405 with several members including observation $\tau_k(t_3)$ 410. Additionally, this example shows several observations $y_t^i$ 420, 425, 430, 435 that are presently not included in track 405. Of those observations, observations 420, 425, 430 are within a circle 415 centered at $\tau_k(t_3)$ 410, and accordingly, $\tau_k(t_3)$ 410 has three neighbors. The joint motion and appearance likelihood of assigning an observation $y_t^i$ to the track $\tau_k$ 410 after $t_i$ is represented by $L(y|\tau_k(t_i))$ in the example.

FIG. 5 shows an example of a spatio-temporal MCMC data association algorithm. The input to the algorithm is the set of original foregrounds Y, initial cover $\omega_0$ and the total number of samples $n_{mc}$. The initial cover $\omega_0$ is initialized with a greedy criteria, namely using the MHT algorithm but keeping only the best hypothesis at each time. The covering rectangles in $\omega_0$ are directly obtained from MBRs of foreground regions. Each move is sampled according to its own prior probability. Since the temporal information is also applied in the spatial moves, we first take $\epsilon*n_{mc}$ ($\epsilon=0.15$ in experiments) temporal moves and then both types of moves are non-discriminatorily considered. Note that, instead of keeping all samples, we only keep the cover with the maximum posterior since we don't need the whole distribution but the MAP estimate.

The target distribution is the posterior distribution of $\omega$, e.g., $\pi(\omega)=p(\omega|Y)$, which is defined on a union of varying dimension subspaces. Some tracking algorithms can use a trans-dimensional MCMC algorithm, which deals with the case of proposal and target distributions in varying dimension spaces. One move from $\omega_m \in \Omega_m$ to $\omega_{m'}$ (m≠m') is a jump between two different models. A Reverse-Jump MCMC can connects these two models by drawing "dimension matching" variables u and u' from proposal distributions $q_m(u)$ and $q_{m'}(u')$ provided that dim($\omega$)+dim(u)=dim($\omega'$)+dim(u'), where dim(•) denotes the dimension of a vector. Then $\omega$ and $\omega'$ can be generated from some deterministic functions of $\omega=g(\omega',u')$ and $\omega'=g(\omega,u)$. The acceptance ratio is defined as follows:

$$\alpha_m(\omega, \omega') = \min\left(1, \frac{\pi(\omega')q_{m'}(\omega|\omega')}{\pi(\omega)q_m(\omega'|\omega)}\left|\frac{\partial(\omega', u')}{\partial(\omega, u)}\right|\right) \quad (23)$$

The temporal moves of merge, split and switch do not change the number of covering rectangles but change only the label of the rectangles. All spatial moves do not change the label of the rectangles but only change the state of rectangles. These types of moves do not change the dimension of the space. The temporal moves of birth, death, extension and reduction involve the issue of trans-dimension dynamics. Note that both dimension increasing and decreasing moves only change one part of the cover and do not affect the remaining part of a cover. For a pair of dimension increasing/decreasing move, if u is a random variable, u~q(u), the move is defined as $\omega'$=g $(\omega,u)$=[$\omega,u$] and dim($\omega'$)=dim($\omega$)+dim(u), then $q_m(w\omega'|\omega)$=q (u). In RJ-MCMC, if u is independent of $\omega$, it is easy to show that the Jacobian is unity.

In such a Markov chain transition, the computation for each MCMC move is actually low, since we only need to compute the ratio $\pi(\omega')/\pi(\omega)$ instead of computing the value of each posterior. Moreover, since the Markov chain dynamics only change one part of the cover and do not affect the remaining part of a cover, the ratio $\pi(\omega')/\pi(\omega)$ can be computed by only considering the change from $\omega$ to $\omega'$. For instance, for a split/merge move, we only need to consider the likelihood change and the prior change for the affected track.

A data association algorithm can make Markov chain transitions by considering specific choices for the proposal distribution $q(\omega'|\omega)$. A data association algorithm can use a group of temporal and spatial cover adjustments to modify a cover. In some implementations, the group include seven temporal moves, see e.g., dynamics 1-7, and three spatial moves, see, e.g., dynamics 8-10. Dynamics 1-7 are temporal moves, which involve changing the label of rectangles. The operation of selecting candidate rectangles in birth move and extension move can include selecting from the covering rectangles of original foreground regions. Dynamics 8-10 are spatial moves, which change the state of covering rectangles. The prior for each move from 1 to 10 are predetermined as p(1) to p(10).

Dynamics 1-2: Forward Birth and Death.

For a forward birth move, we pick two neighbor nodes in different frames to form a track seed, which contains two nodes.

$$\omega=(\{r_i\}_{i=1}^m) \rightarrow (w,\{r_{m+1},r_{m+2}\})=\omega' \quad (24)$$

For the first candidate rectangle, we u.a.r. select one from covering rectangles of original foreground regions that have not been covered, e.g., $q_b(r_{m+1})$ is equal to one over the number of original bounding rectangles that are not covered. Suppose the set of child nodes of $r_{m+1}$ that have not been covered is, child($r_{m+1}$), the probability of selecting the second candidate is $$q_b(r_{m+2} | r_{m+1}) = \frac{(-\log L_A(r_{m+2}, r_{m+1}) + 1)^{-1}}{\sum_{y \in child(r_{m+1})} (-\log L_A(r_{m+2}, r_{m+1}) + 1)^{-1}} \quad (25)$$

When we select the second node in a track seed, we only use appearance likelihood in Eq.25 (since the computation of the motion likelihood needs at least two nodes). To avoid the probability of one candidate dominating all the other, we use the inverse of the negative log likelihood to define the probability.

For the reverse move, we u.a.r. select one from the existing track seeds and remove it from the current cover, e.g., q(seed) is equal to one over the number of track seeds. By Metropolis Hastings method, we need two proposal probabilities $q_{birth}(\omega,\omega')$ and $q_{death}(\omega',\omega)$. $q_{birth}(\omega,\omega')$ is a conditional probability for how likely the Markov chain proposes to move to $\omega'$ and $q_{death}(\omega',\omega)$ is the likelihood for coming back. Then the accept probability of a birth move is $$A(\omega, \omega') = \min\left(\frac{\pi(\omega) q_{death}(\omega', \omega)}{\pi(\omega') q_{birth}(\omega, \omega')}\right) \quad (26)$$

where the proposal probability of a birth move is a product of the prior of a birth move p(1) and the probability of selecting two candidates rectangles, e.g., $$q_{birth}(\omega,\omega') = p(1) q_b(r_{m+1}) q_b(r_{m+2}|r_{m+1}).$$

The proposal probability of a death move is a product of the prior of a death move and the probability of selecting one seed track, e.g., $$q_{death}(\omega',\omega) = p(2) q(seed).$$

Dynamics 3-4: Forward Extension and Reduction.

For a forward extension move, we select a track $\tau_k \in \omega_k$ according to it length, $$\text{e.g., } q_e(\tau_k) = \frac{\exp(-\lambda_e|\tau_k|)}{\sum_{\tau_k \in \omega} \exp(-\lambda_e|\tau_k|)}.$$

Suppose the end node of track k is at frame $t_i$, we select one covering rectangle of an original foreground regions $r_{m+1}$ from child($\tau_k(t_i)$) and add it into $\tau_k$. The probability of selecting a new node $q_e(r_{m+1})$ can be represented as $$q_e(r_{m+1} | \tau_k(t_i)) = \frac{(-\log L(r_{m+1}, | \tau_k(t_i)) + 1)^{-1}}{\sum_{y \in child(\tau_k(t_i)) \cap \tau_0} (-\log L(r_{m+1}, | \tau_k(t_i)) + 1)^{-1}} \quad (27)$$

This probability is similar to the one in Eq.25 but considers both motion and appearance likelihoods.

For the reverse move, we u.a.r. select a track $\tau_k$ that contains more than two nodes and remove the end node from $\tau_k$. To give the capability of multiple extensions or reductions, after one extension, we continue to extend the same track $\tau_k$ with a probability $\gamma_e$. Similarly, after one reduction, we continue to reduce $\tau_k$ with probability $\gamma_r$. The proposal probability of extension is $$q_{extension}(\cdot) = p(3) q_e(\tau_k) (\gamma_e)^{n-1} (1-\gamma_e) \prod_{i=1}^{n} q_e(r_{m+i})$$

and the proposal probability of the reverse move is $q_{reduction}(\cdot) = p(4) q_r(\tau_k)(\gamma_r)^{n-1}(1-\gamma_r)$, where n indicates the number of extension or reduction moves that actually occur.

Dynamics 5-6: Merge and Split.

If a track's ($\tau_{k_1}$) end node is in the parent set of another track's ($\tau_{k_2}$) start node, this pair of tracks is a candidate for a merge move. We select u.a.r. a pair of tracks from candidates and merge the two tracks into a new track $\tau_k = \{\tau_{k_1}\} \cup \{\tau_{k_2}\}$. The proposal probability of a merge move is $q_{merge}(\cdot) = p(5) q_m(\tau_{k_1}, \tau_{k_2})$.

For the reverse move, we select a track $\tau_k$ according to $$q_s(\tau_k) = \frac{\exp(-\lambda_S|\tau_k|^{-1})}{\sum_{|\tau_k| \geq 4} \exp(-\lambda_S|\tau_k|^{-1})}$$

and then select a break point according to the probability $br_k(i)$:

$$br_k(i) = \frac{-\log L(\tau_k(t_{i+1}) | \tau_k(t_i))}{\sum_{j=0}^{|\tau_k|-2} -\log L(\tau_k(t_{i+1}) | \tau_k(t_i))} \quad (28)$$

where $br_k(i)$ is designed to prefer breaking a track at the location where the motion and appearance likelihood has a low value. The nodes in the track which are after the break point are moved to a new track. If the break point happens at the first link or the last link, the split operation has the same effect as a reduction operation. The proposal probability of a split move is $q_{split}(\cdot) = p(6) q_N(\tau_k) br_k(i)$.

Dynamics 7: Switch.

If there exist two locations p,q in two tracks $\tau_{k_1}, \tau_{k_2}$, such that $\tau_{k_1}(t_p)$ is in the parent set of $\tau_{k_2}(t_{q+1})$ and $\tau_{d_2}(t_q)$ is in the parent set of $\tau_{k_1}(t_{p+1})$ as well, this pair of nodes is a candidate for a switch move. We u.a.r. select a candidate and define two new tracks as:

$$\tau_{k_1}' = \{\tau_{k_1}(t_1), \ldots, \tau_{k_1}(t_p), \tau_{k_2}(t_{q+1}), \ldots, \tau_{k_2}(t_{|\tau_{k_2}|})\}$$

$$\tau_{k_2}' = \{\tau_{k_2}(t_1), \ldots, \tau_{k_2}(t_q), \tau_{k_1}(t_{p+1}), \ldots, \tau_{k_1}(t_{|\tau_{k_1}|})\} \quad (29)$$

The reverse move of a switch is symmetric, e.g., the reverse move of a switch is still a switch. The proposal probabilities of a switch move and its reverse move are identical, thus there is no need to compute the proposal probability. The acceptance probability of a switch move is $$A_{switch}(\omega, \omega') = \min\left(1, \frac{\pi(\omega')}{\pi(\omega)}\right)$$

Dynamics 8: Diffusion.

We select one covering rectangle $\tau_k(t)$ in a track according to the probability:

$$q_{dif}(\tau_k(t)) + \frac{-\log L(\tau_k(t_i) \mid \tau_k(t_{i-1}))}{\sum_{k=1}^{K} \sum_{i=2}^{|\tau_k|} -\log L(\tau_k(t_i) \mid \tau_k(t_{i-1}))}.$$

This probability prefers selecting a covering rectangle that has a low motion and appearance likelihood with its preceding neighbor. The low motion and appearance likelihoods indicate that the covering rectangle of the track in this frame may be erroneous. In order to update its state, we first obtain its estimated state $\bar{\tau}(t)$ from the motion model, and then update its position and size according to the appearance model: generate a new covering rectangle $\tau_k(t)$ from the probability $S(\tau_k(t)|\bar{\tau}_k(t))$.

$$S(y_{t'} \mid y_t) \sim N\left(y_t + \alpha \frac{dE}{dx}\bigg|_{x=y_t}, u\right) \quad (30)$$

where $E = -\log L_A(x|y_t)$ is the appearance energy function, $\alpha$ is a scalar to control the step size and u is a Gaussian white noise to avoid local minimum. Some tracking algorithms can use a spatio-scale mean shift vector to approximate the gradient of the negative appearance likelihood in terms of position and scale. A scale space is conceptually generated by convolving a filter bank of spatial DOG (Difference of Gaussian) filters with a weight image. Searching the mode in such a 3D scale space can be implemented in by a two-stage mean-shift procedure that interleaves spatial and scale mode-seeking, rather than explicitly building a 3D scale space and then searching. In our experiments, we only compute the mean shift vector in scale space once, namely perform the spatial mean shift once followed by the scale mean shift without iterations.

In some implementations, a diffusion move can use a RGB color histogram quantized in 16×16×16 bins where a weight image is the backprojection from a color histogram and is masked by foreground regions. For example, the color histogram of one track is derived in a RGB space with 16×16×16 bins. In a diffusion move example, a weight image is computed using histogram backprojection to replace each pixel with the probability associated with that RGB value in the color histogram around an initial state $\bar{\tau}(t)$. The weight image can be masked by foreground regions, e.g., the weight of a background pixel can be zero. A new proposal is generated by drifting the initial state along the mean shift vector and adding a Gaussian noise according to Eq.30. The newly generated covering rectangle takes the place of $\tau_k(t)$. The diffusion move may cause partial foreground regions to be left over. These regions can be covered by new rectangles generated in birth moves if they can form a consistent track. The proposal probability of a diffusion move is $q_{dif}(\cdot) = p(8)q_{dif}(\tau_k(t))S(\tau_k'(t)|\bar{\tau}_k(t))$. The diffusion move is also symmetric. The acceptance ratio of a diffusion move is $$A_{dif}(\omega, \omega') = \min\left(1, \frac{\pi(\omega')S(\tau_k(t) \mid y_t)}{\pi(\omega)S(\tau_k'(t) \mid y_t)}\right) \quad (31)$$

Both motion information and appearance information are considered in the diffusion operation: the initial state of computing mean shift vector is the predicted state according to Kalman filter $\bar{\tau}(t)$ and the diffusion vector is computed according to appearance information. The diffusion is used for generating new hypotheses and the decision of acceptance is still made according to the Metropolis-Hasting algorithm, where the posterior distribution that encodes the joint motion and appearance likelihood plays an important role in accepting a good solution. Since we do not have a precise segmentation of the foreground regions, the appearance computation may not be very accurate when occlusion happens. The motion likelihood helps in estimating a good cover when appearance is not reliable. This is the reason why we need the joint motion and appearance model. The parameters $C_0, \ldots, C_4$ represent the tradeoff between different factors in the posterior and are trained offline to adapt to a specific data set.

Dynamics 9: Segmentation.

If more than one track's prediction $\bar{\tau}_k(t)$ have enough overlap with one covering rectangle y at time t, as illustrated in FIG. 5, this indicates that one covering rectangle may correspond to multiple tracks. Such a rectangle is regarded as a candidate for a segmentation move. The tracks are related tracks of the candidate y. Randomly select such a candidate y and for each related track $\tau_k$ generate a new covering rectangle $\tau_k(t)$ according to the probability $S(\tau_k(t)|\bar{\tau}_k(t))$. The segmentation move is achieved through diffusion moves (each related track performs one diffusion). Thus, the reverse of a segmentation move is also a segmentation move. The acceptance ratio of one segmentation move is $$A_{seg}(\omega, \omega') = \min\left(1, \frac{\pi(\omega')\prod S(\tau_k(t) \mid y_t)}{\pi(\omega)\prod S(\tau_k'(t) \mid y_t)}\right) \quad (32)$$

Dynamics 10: Aggregation.

If one track's prediction $\bar{\tau}_k(t)$ has enough overlap with more than one covering rectangle at time t, as illustrated in FIG. 5, this indicates that the observation of this track in this frame may be fragmented into multiple regions. This forms a candidate for an aggregation move. Randomly select such a candidate $\bar{\tau}_k(t)$ and for the track $\tau_k$ generate a new covering rectangle $\tau_k(t)$ according to the probability $S(\tau_k(t)|\bar{\tau}_k(t))$. The newly generated covering rectangle takes the place of $\tau_k(t)$. The aggregation move is also symmetric and its acceptance ratio is similar to the one in Eq.31. Both segmentation and aggregation moves are implemented by diffusion moves. In other words, the segmentation and aggregation moves are particular types of diffusion moves that address the merged and fragmented observations respectively.

FIG. 6A, 6B, 6C, 6D, 6E show different examples of temporal and spatial moves. In these examples, white circles represent false alarms and a dashed line connecting two or more solid circles represents a track. FIG. 6A shows an example of extension/reduction. FIG. 6B shows an example of split/merge. FIG. 6C shows an example of birth/death. FIG. 6D shows an example of a switch. FIG. 6E shows an example of diffusion.

Figure 7:
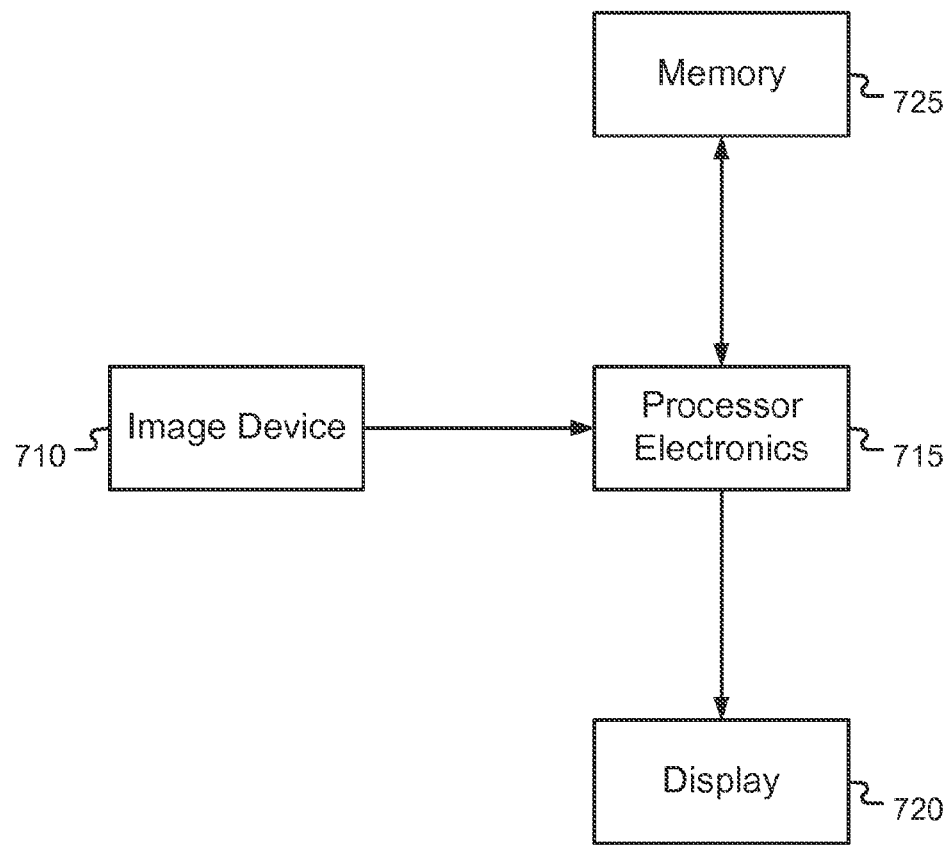
FIG. 7 shows an example of a system for tracking multiple targets.

FIG. 7 shows an example of a system for tracking multiple targets. A system can include one or more image devices 710 such as a digital camera or a video camera configured to produce a video feed, processor electronics 715, memory 725, and a display 720. Processor electronics 715 can include one or more processors in communication with one or more memories 725. Memory 725 can store data such as a video feed. In some implementations, a video feed includes multiple images or frames. Processor electronics 715 can perform operations such as the ones described herein. In some implementations, processor electronics 715 can include memory 725. Display 720 can display one or more target tracks.

Processor electronics 715 can receive a video feed from image device 710 over a wired or wireless connection. Wired connection examples include USB cables, coax cables, and network cables such as those that provide connectivity to a network such as the Internet. In some implementations, image device 710 can include a removable a memory storage device such as a non-volatile memory device configured to store frames from a video feed. Processor electronics 715 can access the frames by reading data from the removable memory storage device.

Figure 8:
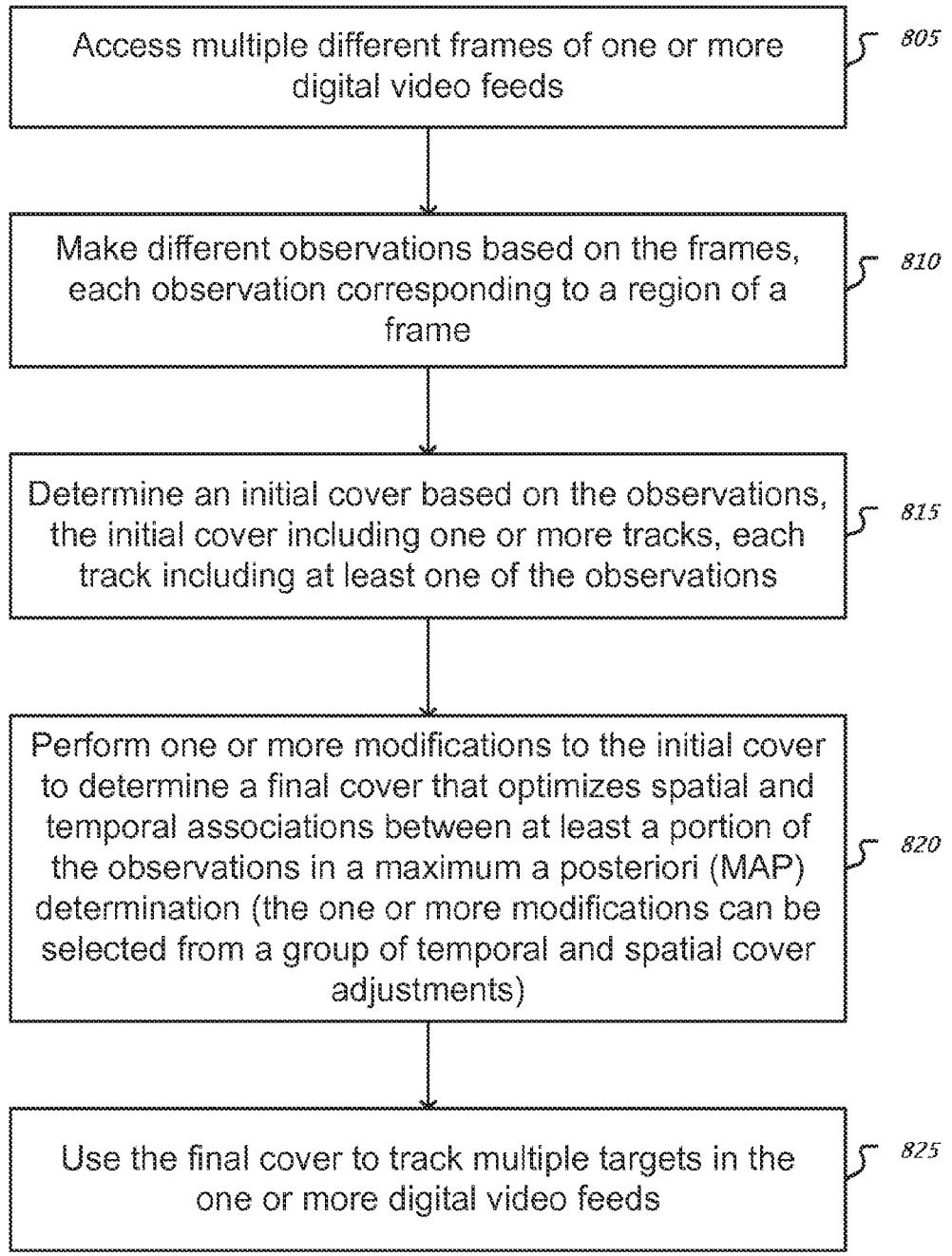
FIG. 8 shows an example of a process for tracking multiple targets.

FIG. 8 shows an example of a process for tracking multiple targets. In some implementations, the process is divided in to two or more processes and/or programs. The process can access multiple different frames of one or more digital video feeds (805). The process can make different observations based on the frames, each observation corresponding to a region of a frame (810). The process can determine an initial cover based on the observations (815). The initial cover can include one or more track, with each track including at least one of the observations. The process can perform one or more modifications to the initial cover to generate a final cover (820). Performing one or more modifications to generate a final cover can include selecting one or more adjustments from a group that includes temporal cover adjustments and spatial cover adjustments, and can include using likelihood information indicative of similarities in motion and appearance to distinguish different targets in the frames. The process can use the final cover to track multiple targets in the one or more digital video feeds (825).

Properly selecting the parameters in Eq. 21 can assure that a Markov chain converges to the correct distribution. A posterior can be only known up to a scale because the computation of the normalization factor over the entire $\omega$ is intractable. The parameters, which can encode specific domain knowledge, such as false alarms, overlap, etc., can be highly scenario-related. Determining the parameters in a posterior estimation can including determining the parameters automatically by Linear Programming. Given one $\omega$, the log posterior density function is a linear combination of the parameters (note that the log posterior density is not a linear function of $\omega$, otherwise direct optimization of such a posterior can be expected). Such a linear combination in parameter space is commonly seen in the definition of a posterior that can be factorized into a set of independent components. In some implementations, performing a DD-MCMMC algorithm can include computing the ratio $\pi(\omega')/\pi(\omega)$ in the Markov chain transition instead of computing the value of $\pi(\omega')$ and $\pi(\omega)$. Although we cannot know the value of $\pi(\omega')$ and $\pi(\omega)$, we can establish a set of constraints $\pi(\omega)/\pi(\omega') \geq$ (or $\leq$) 1 if we know whether one solution is no worse than the other. Such constrains can be transformed into a set of linear inequations of the parameters. After collecting enough inequations, we can apply linear programming to find a feasible solution of the parameters. Given ground truth data, the information of how one solution compares to a different solution can be determined by degrading the ground truth using spatial and temporal moves. The ground truth can include tracks with correct label and locations.

In some implementations, a parameter estimation technique can include obtaining foreground regions as observations. By fitting partial ground truth and observations into the motion model, the parameter estimation technique can determine parameters in the motion model, e.g., Q and R in Eq.14. This information is required to compute $S_{mot}$ in Eq.21. Then the parameter estimation technique can start with the best cover $\omega^*$ obtained from the ground truth and use the temporal and spatial moves to degrade the best cover to $\omega_t$. For each $\omega_i$, we have a constraint that $$\pi(\omega^*)/\pi(\omega_i) \geq 1 \quad (33)$$

Given one cover, according to Eq.21, the log function of the posterior $f(C|\omega)\Delta = \log(p(\omega|Y))$ is a linear function in terms of the free parameters. Eq.33 provides one linear inequation, e.g., $f(C|\omega^*) - f(C|\omega_t) \geq 0$. After collecting multiple constraints, the parameter estimation technique can use linear programming to find a solution of positive parameters with a maximum sum as Maximize: $a^T C$ Subject to: $A^T C \leq b, C \geq 0$ (34)

where $C = [C_0, \ldots, C_4]$, $a = [1, 1, 1, 1, 1]^T$, and each row of $A^T C \leq b$ encodes one constraint from Eq.33.

Some scenarios can have numerous constraints such as 5,000 constraints and can cover most of the cases of different moves from multiple sequences in one data set. In some implementations, these constraints are sequentially generated and added to a constraint set. Due to the ambiguity existing in ground truth, a small number of conflict constraints may exist. A constraint that conflicts with the existing set can be ignored. In fact, the objective function, namely, a in LP in Eq.34 is a rather loose parameter as long as enough constrains are collected. For example, any vector a containing five positive numbers can work.

A tracking algorithm can include a data association algorithm. The input to the tracking algorithm can include foreground regions which are extracted using a dynamic background model estimated within a sliding window. In some implementations, a data association algorithm can include online algorithm within a sliding window of size W. The overlap between sliding windows is defined by $\Delta_W$. When a sliding window moves, the new sliding window has $\Delta_W$ new frames and $W - \Delta_W$ frames overlap with the previous sliding window. The cover of the overlapped part of the current sliding window can be initialized from the best cover of the previous sliding window. The cover of the new frames is initialized by the greedy criterion. In some implementations, $\Delta_W = 1$. The online version can reduce the complexity of data association and control the delay of output for long sequences. In some implementations, tracking is performed automatically from detected blobs in a set of frames without any manual initialization. In some implementations, a tracking algorithm can use online tracking with a sliding window $W = 50$ and $n_{mc} = 1000$. The first sliding window can be initialized with the greedy criteria. The complete track can be defined as 80% of the trajectory is tracked and no ID changes. In some implementations, the tracking process can run at around 3 fps on a Pentium IV 3.0 GHz PC.

In some implementations, the tracking algorithm can include bi-directional, e.g., forward and backward, sampling applied in a symmetric way, to estimate the trajectories and label them consistently throughout the sequence. Thus, the tracking algorithm can deal with cases where targets are merged or split when they appear. The tracking algorithm can incorporate model information and can use it to guide the spatial and temporal MCMC sampling. In some implementations, the tracking algorithm can assign a model likelihood for each node to extend the likelihood function and can use model information to drive the MCMC proposal. In some implementations, the tracking algorithm can use data association at the level of tracklets.

Implementations of the subject matter and the functional operations described in this document can be implemented in digital electronic circuitry, or in computer software, firmware, or hardware, including the structures disclosed in this document and their structural equivalents, or in combinations of one or more of them. Implementations of the subject matter described in this document can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-tactile, or tactile input.

Implementations of the subject matter described in this document can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this document, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this document contains many specifics, these should not be construed as limitations on the scope of the disclosure or of what may be claimed, but rather as descriptions of features specific to particular implementations of the disclosure. Certain features that are described in this document in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated.

What is claimed is:

1. A computer-implemented method for target tracking, the method comprising:
    accessing multiple observations, the multiple observations collectively comprising depictions of two or more mobile targets;
    processing the observations to produce an initial cover, the initial cover comprising tracks that correspond to movements of the two or more mobile targets through space and time; and
    iteratively refining the initial cover to produce a refined cover by using a Data Driven Markov Chain Monte Carlo (DD-MCMC) routine.

2. The method of claim 1, wherein iteratively refining the initial cover comprises selecting one or more adjustments from a group of temporal and spatial cover adjustments.

* * * * *